No. 854,020. PATENTED MAY 21, 1907.
L. W. BOSSERT.
BRANCH CONDUIT BOX FOR ELECTRIC WIRES.
APPLICATION FILED FEB. 19, 1906.
2 SHEETS—SHEET 1.
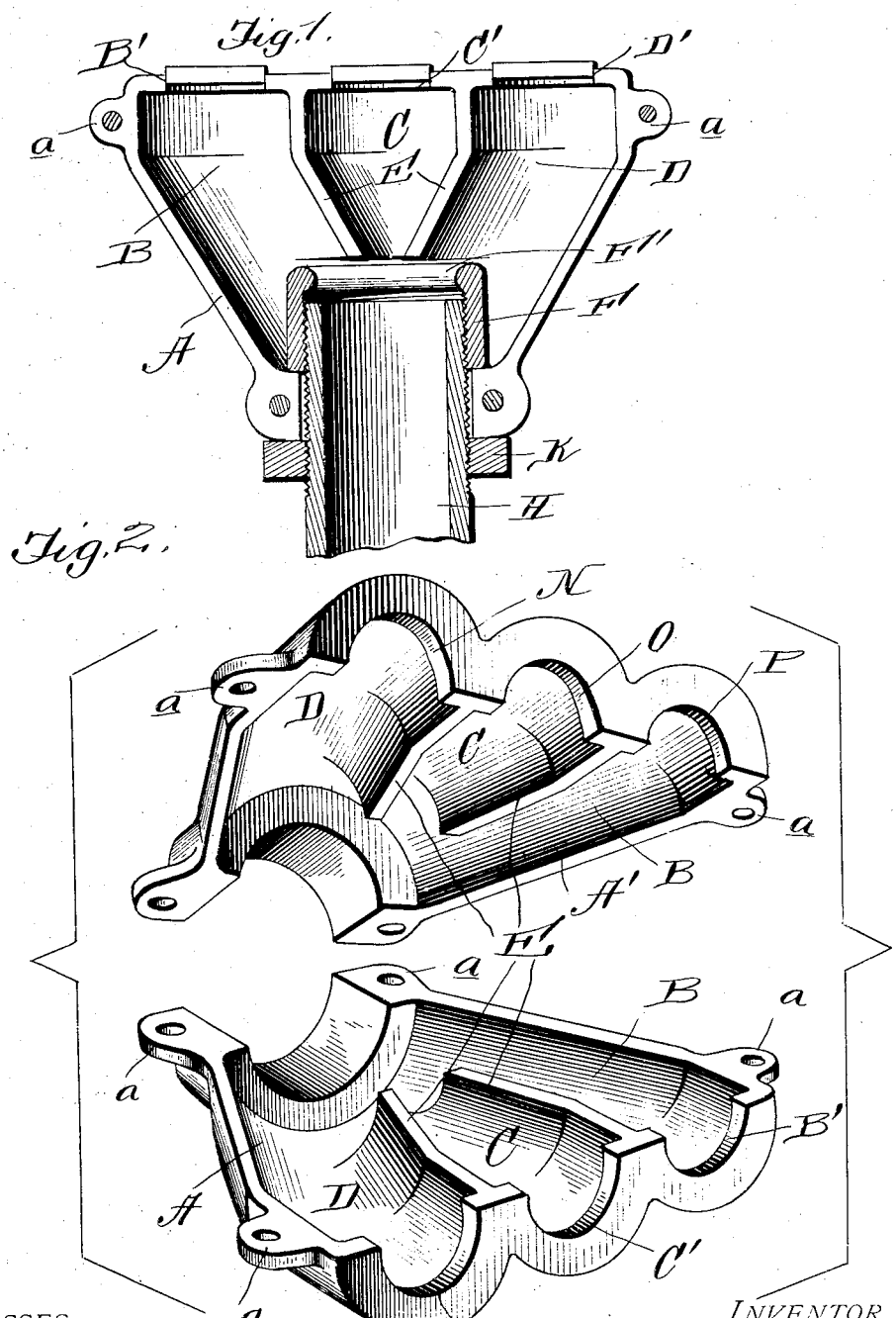
WITNESSES:
R. W. Boswell
A. L. Haug
INVENTOR
Leon W. Bossert,
By Franklin N. Hough
Attorney No. 854,020. PATENTED MAY 21, 1907.
L. W. BOSSERT.
BRANCH CONDUIT BOX FOR ELECTRIC WIRES.
APPLICATION FILED FEB. 19, 1906.
2 SHEETS—SHEET 2.
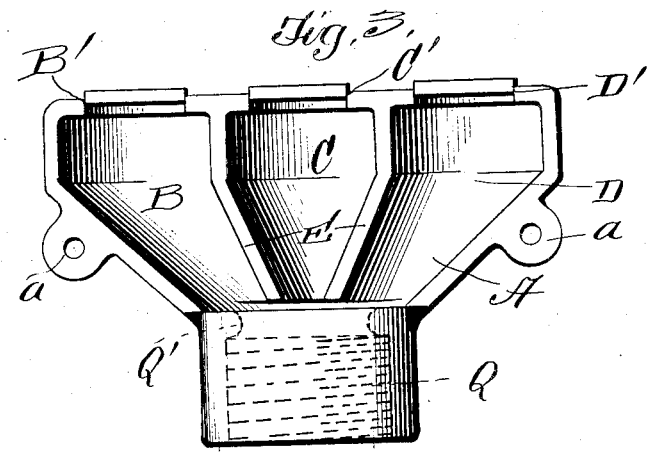
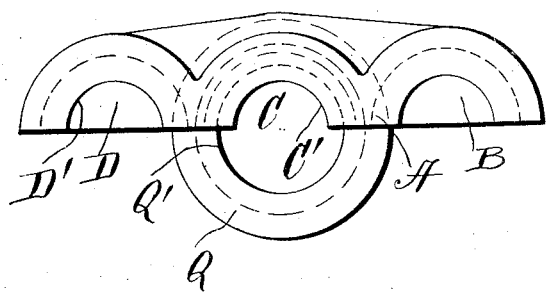
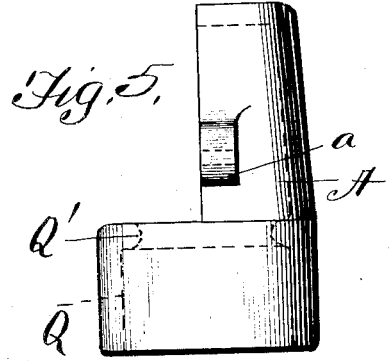
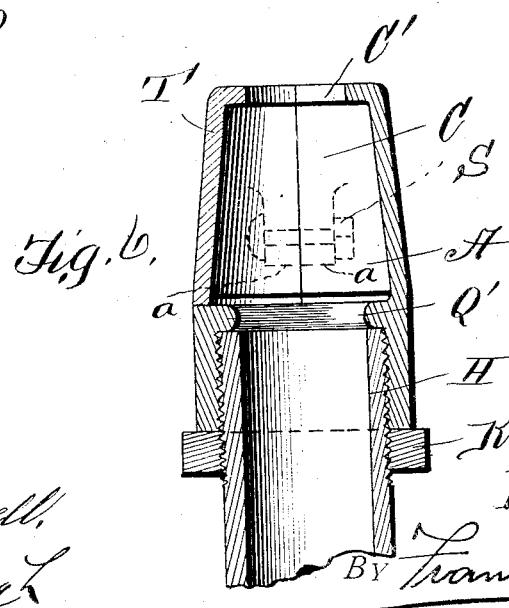
WITNESSES:
R. V. Boswell,
A. L. Haugh
INVENTOR
Leon W. Bossert
BY Franklin H. Hough
Attorney

UNITED STATES PATENT OFFICE.

LEON W. BOSSERT, OF UTICA, NEW YORK.

BRANCH CONDUIT-BOX FOR ELECTRIC WIRES.

No. 854,020.　　　Specification of Letters Patent.　　　Patented May 21, 1907.

Application filed February 19, 1906. Serial No. 301,831.

*To all whom it may concern:*

Be it known that I, LEON W. BOSSERT, a citizen of the United States, residing at Utica, in the county of Oneida and State of New York, have invented certain new and useful Improvements in Branch Conduit-Boxes for Electric Wires; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in branch conduit boxes for insulated electric wires, and the object in view is to provide a box divided into chambers for the division of the electric wires of a conduit, the main and divided chambered portions of the box communicating with the conduits of insulated electric wires in either direction, with the wires separated and branched.

The invention consists further in the provision of a branch box in which one or more insulated electric wires are contained in a single main conduit and in which box it is desired to provide means for distributing the wires through apertures in the box either through iron conduits, wooden moldings or by means of porcelain knobs and tubes, to different locations where required, provision being made in the box for either use, conduit branches being fastened and connected to the box by means of bushings and locked nuts.

The present invention consists further in other details of construction and arrangements of parts which will be hereinafter fully described and then specifically defined in the appended claims.

I illustrate my invention in the accompanying drawings in which:—

Figure 1 is a sectional view longitudinally through my improved branch junction box and a conduit pipe connected thereto. Fig. 2 is a perspective view showing the two complemental sections of the box disassembled. Fig. 3 is a sectional view through a slightly modified form of branch junction box. Fig. 4 is an end view of the modified form shown in Fig. 3. Fig. 5 is an edge view, and Fig. 6 is a sectional view through a box of the modified form, with a closure fastened thereto.

Reference now being had to the details of the drawings by letter, A designates a branch box to which a main and two or more branch conduits are adapted to be connected, the box being adapted to be connected at its branching end to a suitable wooden molding through which the branch conduits may pass. The flaring portion of said box is divided into three compartments, designated in the drawings by letters B, C, and D, and an aperture B' opens through the end of the box into the compartment B, an opening C' into the compartment C and an opening D' into the compartment D. Said openings are preferably closed by means of plugs which are struck up from the wall of the box and may be readily severed when desired to run a conduit through the aperture, and in the event of it not being desired to pass a branching conduit through one or the other of the openings, the plugs may remain intact within the aperture to form a closure therefor. The inner ends of the partitions E within said box are inclined toward each other and terminate adjacent to the inner end of a bushing F which has its inner wall threaded and adapted to receive the threaded circumference of the conduit pipe H, and the inner end of said bushing has a convexed beading F' against which the inner end of the pipe H is adapted to bear to limit its inner movement, and a threaded lock nut K is mounted upon the threaded circumference of the pipe H and is adapted to bear against the contracted end of the junction box in the manner shown clearly in Fig. 1 of the drawings, whereby the conduit pipe may be securely locked to the bushing and within the branch box.

It will be noted upon reference to Fig. 2 of the drawings, that the cover or closure A' of the branch box is similar in construction to the box itself, and each is provided with apertured lugs *a* through which bolts may be passed for the purpose of holding the cover to the box after the conduit, with its branching wires, is secured in place. Said cover is provided at its flaring end with the openings N, O and P which correspond with the openings B', C' and D' and are adapted to form, with the latter, circular-outlined openings when the cover is applied to the box.

In Fig. 3 of the drawings, I have shown a slight modification in the construction of my branch box in which the flaring portion of the box is divided into compartments B, C and D by means of the partitions E, and the contracted end of the box has a circular-outlined opening Q, the inner wall of which is threaded, and a bead Q' projects about the inner end of said opening Q, forming an abutment means, against which the end of the conduit pipe H is adapted to bear, as shown clearly in Fig. 6 of the drawings. The modified form of the box has a cover T, shown in Fig. 6 of the drawings, which contacts with the marginal edge of the flaring portion of the box and is held thereto by means of bolts S passing through registering lugs in the cover and box. A lock nut K is fitted upon the threaded circumference of the pipe H and serves to hold the pipe securely locked to the box, as will be readily understood.

From the foregoing, it will be noted that by the provision of a box made in accordance with my invention, means is afforded for securely holding the main conduit to the box and affording separate compartments for the branching wires which may be led through openings in the flaring end of the box and passed through a molding or other objects to any part of a building, as may be desired, thus holding securely the wires of the conduit separated one from another, it being understood that suitable porcelain bushings for insulators may be inserted through the openings in the box and through which the electric wires pass.

What I claim is:—

1. A branch box for electric conduits comprising two hollow complemental shell sections, each divided into chambers by integral ribs, the marginal edges of which are adapted to contact with each other when the two parts are fastened together, thereby forming inclosed chambers, the end of each section having an inwardly extending flange with a cut-away portion opposite each chamber, means for holding the sections together, and a bushing held by the sections and adapted to receive a conductor pipe, as set forth.

2. A branch box for electric conduits comprising two hollow complemental shell sections, each divided into chambers by integral ribs, extending only partially the length of each section, the edges of said ribs being flush with the edges of the shell sections and adapted, when the latter are fastened together, to form inclosed chambers, a flange integral with the outer flaring end of each section and provided with a cut-away portion opposite each chamber, a bushing mounted between the sections and held between the ends of said ribs and the shoulder adjacent to the inner ends of the shell, a conductor pipe having threaded connection with said bushing, and a nut mounted upon the pipe and adapted to bear against the tapering ends of said shell sections, as set forth.

In testimony whereof I hereunto affix my signature in the presence of two witnesses.

LEON W. BOSSERT.

Witnesses:
M. J. HORN,
GEO. M. SPEAKER.